(12) United States Patent
Kim et al.

(10) Patent No.: US 8,016,950 B2
(45) Date of Patent: Sep. 13, 2011

(54) HYDRAULIC DRIVE TYPE PARTIAL INTER-TUBE LANCING SYSTEM FOR CLEANING STEAM GENERATOR IN NUCLEAR POWER PLANT

(75) Inventors: Seok Tae Kim, Daejeon (KR); Woo Tae Jeong, Daejeon (KR)

(73) Assignee: Korea Electric Power Corporation, Seoul (KR)

( * ) Notice: Subject to any disclaimer, the term of this patent is extended or adjusted under 35 U.S.C. 154(b) by 548 days.

(21) Appl. No.: 12/324,773

(22) Filed: Nov. 26, 2008

(65) Prior Publication Data

US 2010/0071734 A1    Mar. 25, 2010

(51) Int. Cl.
*B08B 9/20* (2006.01)
(52) U.S. Cl. .................................................. 134/167 R
(58) Field of Classification Search ............... 134/167 R
See application file for complete search history.

(56) References Cited

U.S. PATENT DOCUMENTS

| | | | |
|---|---|---|---|
| 5,341,406 A * | 8/1994 | Jens et al. | 376/316 |
| 5,913,320 A | 6/1999 | Varrin, Jr. et al. | 134/22.18 |
| 7,086,353 B2 | 8/2006 | Hwang et al. | 122/380 |

FOREIGN PATENT DOCUMENTS

| | | |
|---|---|---|
| JP | 07-019793 | 1/1995 |
| JP | 09-019650 | 1/1997 |
| JP | 10-030898 | 2/1998 |
| JP | 2000-130703 | 5/2000 |
| JP | 2007-127351 | 5/2007 |
| KR | 10-2006-0108388 | 10/2006 |
| KR | 10-0820236 | 4/2008 |

* cited by examiner

*Primary Examiner* — Frankie L Stinson
*Assistant Examiner* — Samuel Waldbaum
(74) *Attorney, Agent, or Firm* — McDermott Will & Emery LLP (57) ABSTRACT

A hydraulic drive type partial inter-tube lancing system for cleaning a steam generator in a nuclear power plant, which removes foreign matter, such as sludge, deposited around heat transfer tubes in the steam generator, is disclosed. More particularly, a hydraulic drive type partial inter-tube lancing system, which serves to clean a steam generator of a light-water reactor in a nuclear power plant by removing sludge, attached inside the steam generator, using high-pressure water, is disclosed.

9 Claims, 11 Drawing Sheets

HYDRAULIC DRIVE TYPE PARTIAL INTER-TUBE LANCING SYSTEM FOR CLEANING STEAM GENERATOR IN NUCLEAR POWER PLANT

BACKGROUND OF THE INVENTION

1. Field of the Invention

The present invention relates to a hydraulic drive type partial inter-tube lancing system for cleaning a steam generator in a nuclear power plant, which can remove foreign matter, such as sludge, deposited around heat transfer tubes in the steam generator, and more particularly, to a hydraulic drive type partial inter-tube lancing system, which serves to clean a steam generator of a light-water reactor in a nuclear power plant by removing sludge, attached inside the steam generator, using high-pressure water.

2. Description of the Related Art

Generally, a steam generator provided in a nuclear power plant is a very important structure, wherein primary cooling water, to which heat energy generated from a reactor is transferred, and secondary cooling water meet each other and undergo heat exchange on the boundary of heat transfer tubes in the steam generator.

As a turbine is operated by steam, generated via the above-described heat exchange in the steam generator, to convert kinetic energy into electric energy, generation of electricity is accomplished. However, as the operating history of the nuclear power plant increases, wear of secondary system tubes occurs and thus, metal components separated from the tubes are deposited, as sludge, in the steam generator.

The sludge in the steam generator is divided into relatively soft sludge and relatively hard sludge, in view of the strength thereof. In the case of soft sludge, it is mainly deposited on an upper layer tube sheet in the steam generator. On the other hand, sludge deposited on a lower layer tube sheet in the steam generator becomes hard by heat of heat transfer tubes.

The deposited sludge deteriorates heat-transfer ability of small-diameter tubes in the steam generator, resulting in a reduction in heat output efficiency. This is directly connected with a reduction in the output of the nuclear power plant. Stoppage of a nuclear power plant due to deterioration in output has been reported in some countries.

Furthermore, local corrosion of the steam generator causes premature exchange of the steam generator, resulting in enormous economic loss. Therefore, conventionally, a nuclear power plant periodically undergoes a planned precautionary maintenance service and in particular, during the planned precautionary maintenance service, removal of sludge deposited on the upper end of the tube sheet in the steam generator is attempted.

Here, methods for removing the sludge in the steam generator include a high-pressure water ejection method, a chemical cleaning method, an ultrasonic cleaning method, a complex cleaning method and the like. Of these various methods, the chemical cleaning method exhibits the most outstanding cleaning efficiency, but has a weak point, for example, corrosion of small-diameter tubes and therefore, implementation of the chemical cleaning method has been conventionally limited to only two or three times during the entire lifespan of a nuclear power plant.

In the case of the recently developed ultrasonic cleaning method, development of various related cleaning technologies is actively in progress, but accurate evaluation of cleaning efficiency has yet to be presented.

In a state wherein a distinguished alternative method is not yet developed, accordingly, it can be said that the high-pressure water ejection method is an actual cleaning method as one of most advantageous proposals.

One example of a conventional apparatus for removing sludge deposited in a steam generator is disclosed, by the applicant of the present invention, in Korean Registered Patent No. 575,110 (also registered as U.S. Pat. No. 7,086,353). However, the disclosed conventional technology has many problems, as follows. First, due to a bulky volume of a rail, a lance, which is adapted to enter between heat transfer tubes in a steam generator, must be inevitably reduced in length. Further, the lance performs cleaning of only one row of heat transfer tubes via one ejection of high-pressure water, requiring an excessively long cleaning time. As a conclusive problem, drive power, required to fold and unfold the lance or to perform twisting rotation of the lance, is supplied by a servo motor. The servo motor is exposed to high radiation energy in the steam generator and therefore, suffers from frequent failures due to deterioration thereof by the high radiation energy.

SUMMARY OF THE INVENTION

Therefore, the present invention has been made in view of the above problems, and it is an object of the present invention to provide a hydraulic drive type partial inter-tube lancing system for cleaning a steam generator in a nuclear power plant, wherein a lancing robot is provided with a plurality of lances to simultaneously clean three rows of heat transfer tubes via one ejection of high-pressure water, achieving a reduction in operating time, and wherein each lance has an increased length sufficient to access a deeper region between the heat transfer tubes, resulting in enhanced cleaning efficiency.

It is another object of the present invention to provide a hydraulic drive type partial inter-tube lancing system for cleaning a steam generator in a nuclear power plant, wherein lances of a lancing robot can be unfolded and folded in the steam generator using a hydraulic force and spring force without a servo motor, and wherein a driving device to enable twisting rotation and rectilinear reciprocating movements of a lancing robot and barrel spray is installed at the outside of the steam generator so as to be relatively less affected by radiation energy, thereby preventing frequent failures thereof and achieving improved durability.

In accordance with the present invention, the above and other objects can be accomplished by the provision of a hydraulic drive type partial inter-tube lancing system for cleaning a steam generator in a nuclear power plant, wherein: a rail is installed in an elongated rectangular receiving space in the steam generator, by use of a rail supporter and hand-hole flange fastened to a cylindrical fixing rod and hand-hole of the steam generator, by passing through a driving device; the driving device includes first and second servo motors, a pulley, a strip scroll box from which a transfer strip is unwound so as not to prevent operation of the system, and a geared rotating joint for transmission of a twisting rotation force; the rail takes the form of an assembly of three rail segments and has a center elongated rectangular opening for mounting of a lancing robot and barrel spray, and a transfer strip slot for movement of the transfer strip, the rail being able to perform twisting rotation; the lancing robot includes an elongated lance of a small-diameter and long-length provided with a high-pressure water nozzle to eject high-pressure water with straightness; and a cable handling device is provided to handle an electric power cable or a high-pressure water hose for supplying electric power and high-pressure water to the system so as not to prevent operation of the system.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

A hydraulic drive type partial inter-tube lancing system for cleaning a steam generator in a nuclear power plant according to the present invention comprises: as main components, a lancing robot 300 having elongated lances 301 of a small-diameter and long-length; a barrel spray 600 formed with a plurality of nozzles 601 to achieve a high ejection capability; a rail 800 having a crescent-shaped slot 804; a transfer strip 701 having a crescent-shaped cross section, the transfer strip 701 being wound and stored in a strip scroll box 1005; rear and front rail supporters 900 and 903 using bearings; a hand-hole flange 901 to mount the hydraulic drive type partial inter-tube lancing system at a hand-hole 102 of the steam generator; a driving device 1000 to enable twisting rotation and rectilinear reciprocating movements of the lancing robot 300 and barrel spray 600; and cable handling devices 1100 to prevent any inference with movements of the hydraulic drive type partial inter-tube lancing system.

Each of the lances 301 is provided, at a distal end thereof, with a pair of high-pressure water nozzles 401 to allow high-pressure water ejected therefrom to maintain straightness over a long distance. The lacing robot 300 has a metallic pivoting hinge 304 to enable folding and unfolding of the lance 301, and a metallic lance binder 305 to firmly keep the lance 301 at a fixed position, in cooperation with a plastic lance support 405, for enabling stable ejection of high-pressure water.

Figure 3:
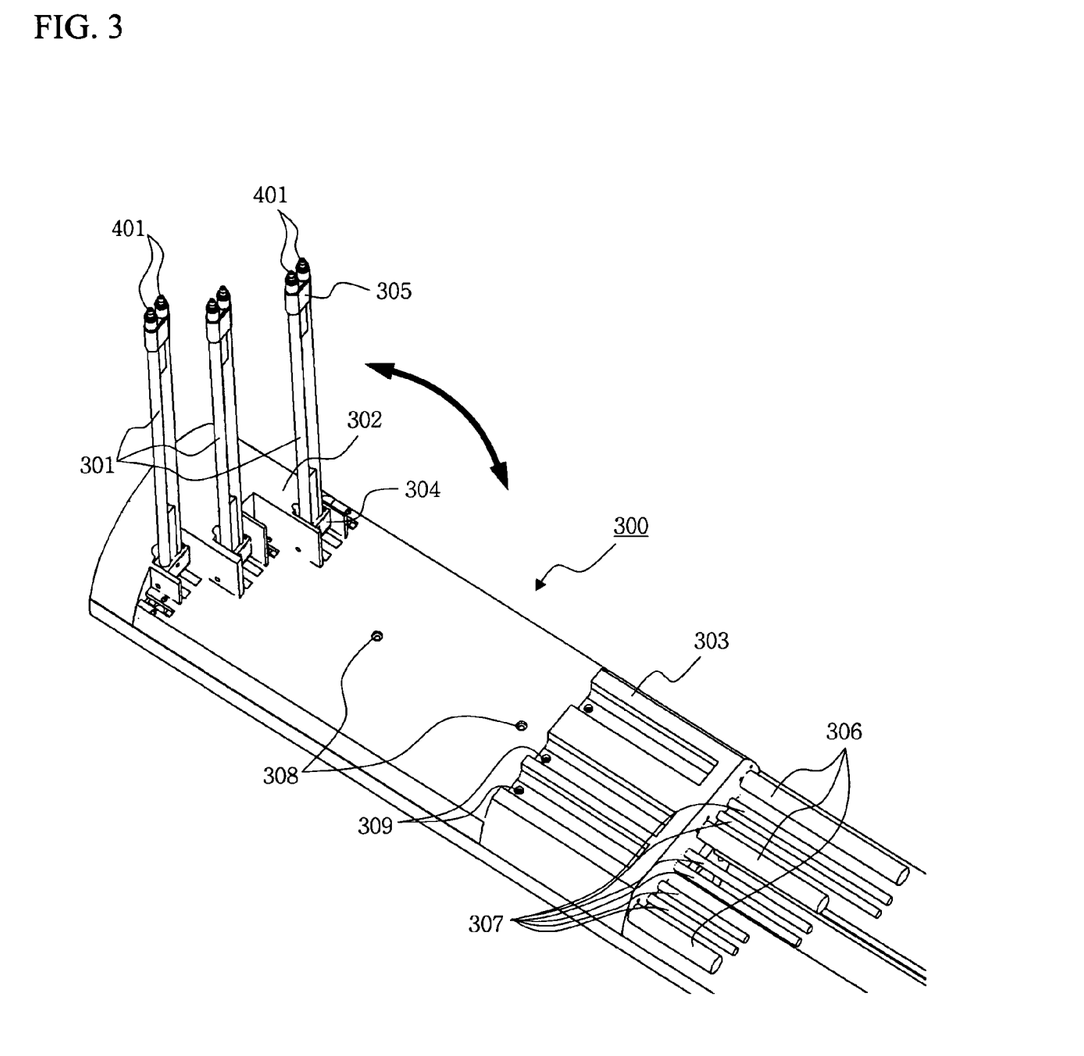
FIG. 3 is a view illustrating a lancing robot according to the present invention.
Figure 4:
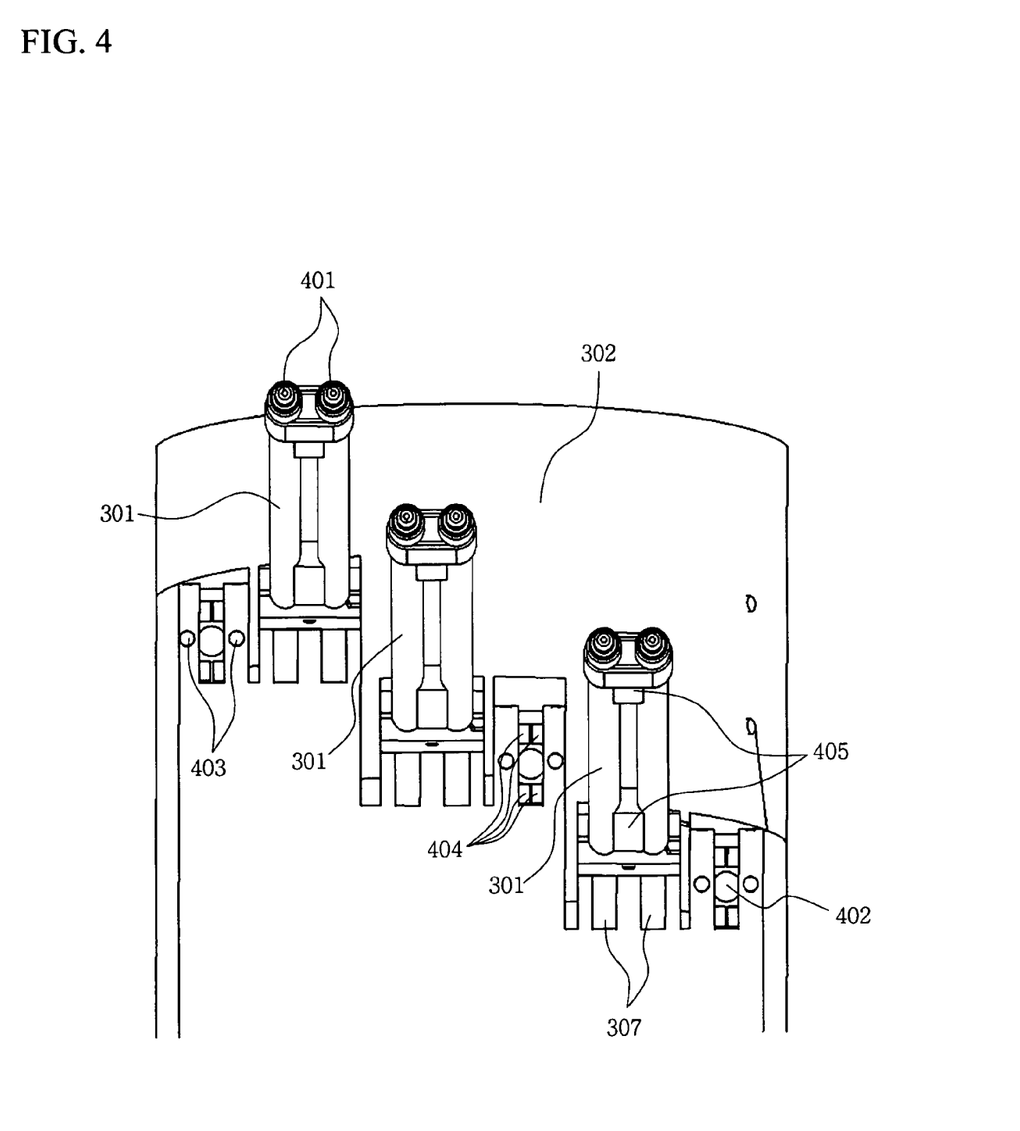
FIG. 4 is a partially enlarged view of FIG. 3.
Figure 5:
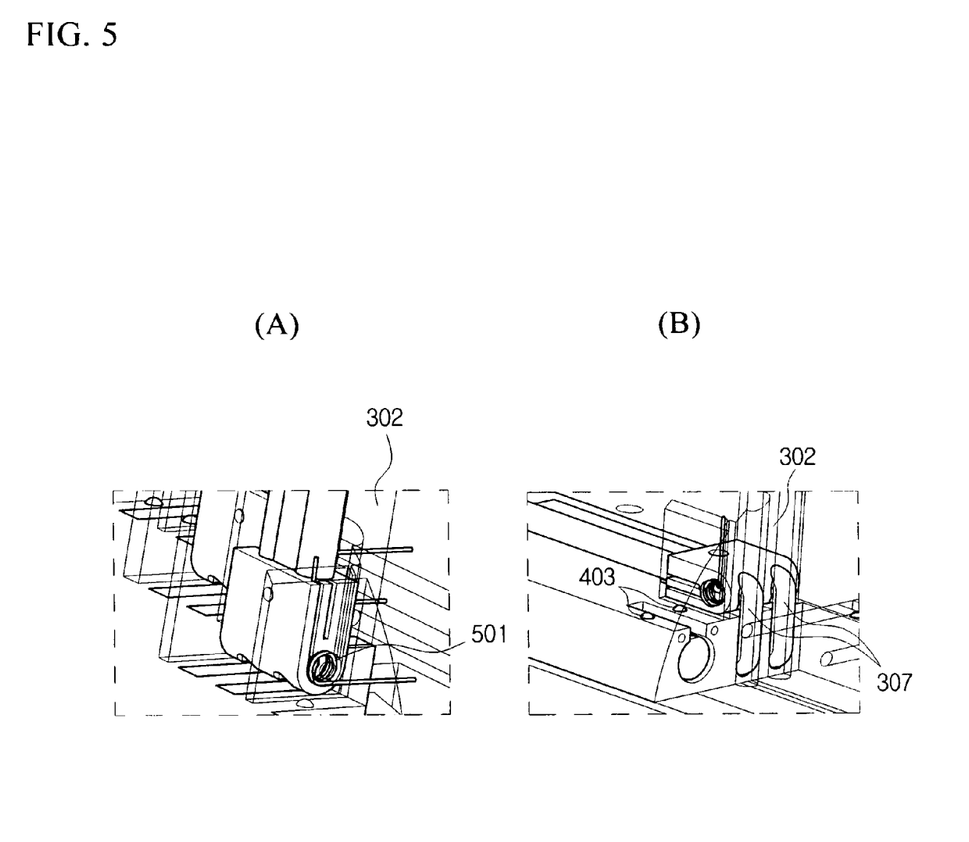
FIGS. 5A and 5B are views illustrating operation of lances.
Figure 6:
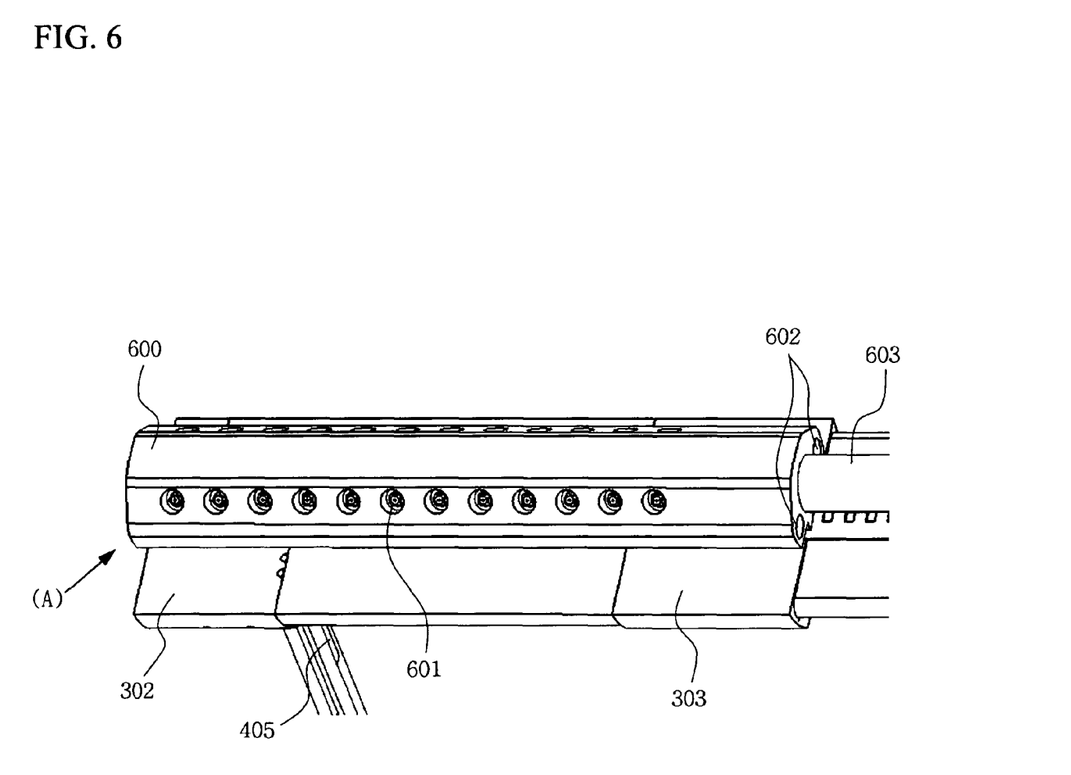
FIG. 6 is a partially enlarged view of a barrel spray.

The lancing robot 300 is adapted to fold and unfold the lance 301 using a force caused as a high-pressure hose 307 is unfolded by a hydraulic force thereof, rather than using a motor (see FIGS. 3 and 5). Upon unfolding of the lance 301, an electromagnetic head 302 of the lancing robot 300 serves to mechanically limit the lance 301 from being unfolded beyond 90 degrees, and assists the metallic pivoting hinge 304 to erect the lance 301 at a right angle.

Upon folding of the lance 301, the supply of high-pressure water is stopped to remove the hydraulic force, whereby the lance 301 is returned to an original position thereof via operation of a return spring 501. In this case, an electromagnetic lance return block 303 magnetically leads the return of the lance 301 and controls the lance 301 so as not to escape from a proper position during movement of the lancing robot 300.

The lancing robot 300 is provided with an endoscope camera 402 and endoscope main and auxiliary lamps 404 and 403, to confirm whether or not the lance 301 is upright. Once the lance 301 is erected to be upright, the lancing robot 300 enters between heat transfer tubes of the steam generator via twisting rotation and rectilinear reciprocating movements thereof, to wash off or push out sludge or other foreign matter deposited on the upper end of a tube sheet in the steam generator via ejection of high-pressure water.

The lancing robot 300 may be configured such that three lances 301 are operated simultaneously to clean three rows of heat transfer tubes via one ejection of high-pressure water, and thus, has the effect of reducing an operating time of a conventional cleaning apparatus to one third.

The barrel spray 600 serves to clean the upper end of the tube sheet in the steam generator, and more particularly, a kidney-bean zone in the center of the steam generator showing excessive sludge deposition by use of a high flow rate of high-pressure water from a barrel spray hose 603, the high-pressure water from the barrel spray hose 603 being supplied separately from that from the lancing robot 300. The barrel spray 600 is mounted at an opposite side of the lancing robot 300. Accordingly, to perform a cleaning operation using the barrel spray 600, the rail 800 must undergo twisting rotation by 180 degrees such that an ejection direction of the barrel spray 600 is oriented downward. In such a state, the barrel spray 600 can perform a cleaning operation using the plurality of nozzles 601, and more particularly, a total of twenty four nozzles 601 via rectilinear reciprocating movements thereof. In this case, to minimize rotational inertia, the barrel spray 600 is designed to have weight-reduction voids 602, to assure smooth rectilinear reciprocating movements thereof.

Figure 7:
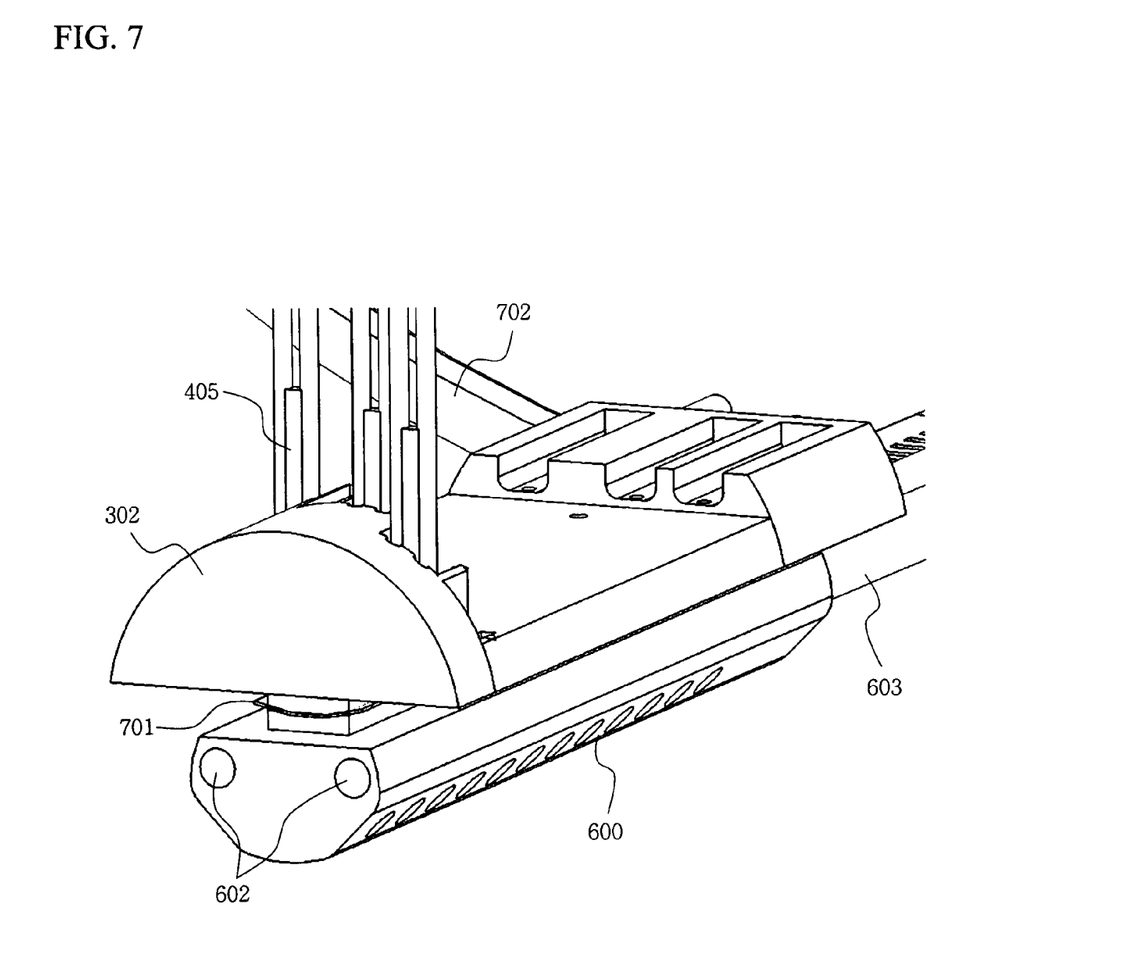
FIG. 7 is a view illustrating an inverted state of the barrel spray, when viewed from a direction of the arrow A of FIG. 6.

The lancing robot 300 and barrel spray 600, as shown FIG. 7, are provided, at engaging surfaces thereof with a convex surface and a concave surface, respectively, for insertion of the crescent-shaped transfer strip 701. Once the transfer strip 701 is inserted between the convex and concave surfaces, the lancing robot 300 and barrel spray 600 are fastened to each other via vertical bolting.

Figure 8:
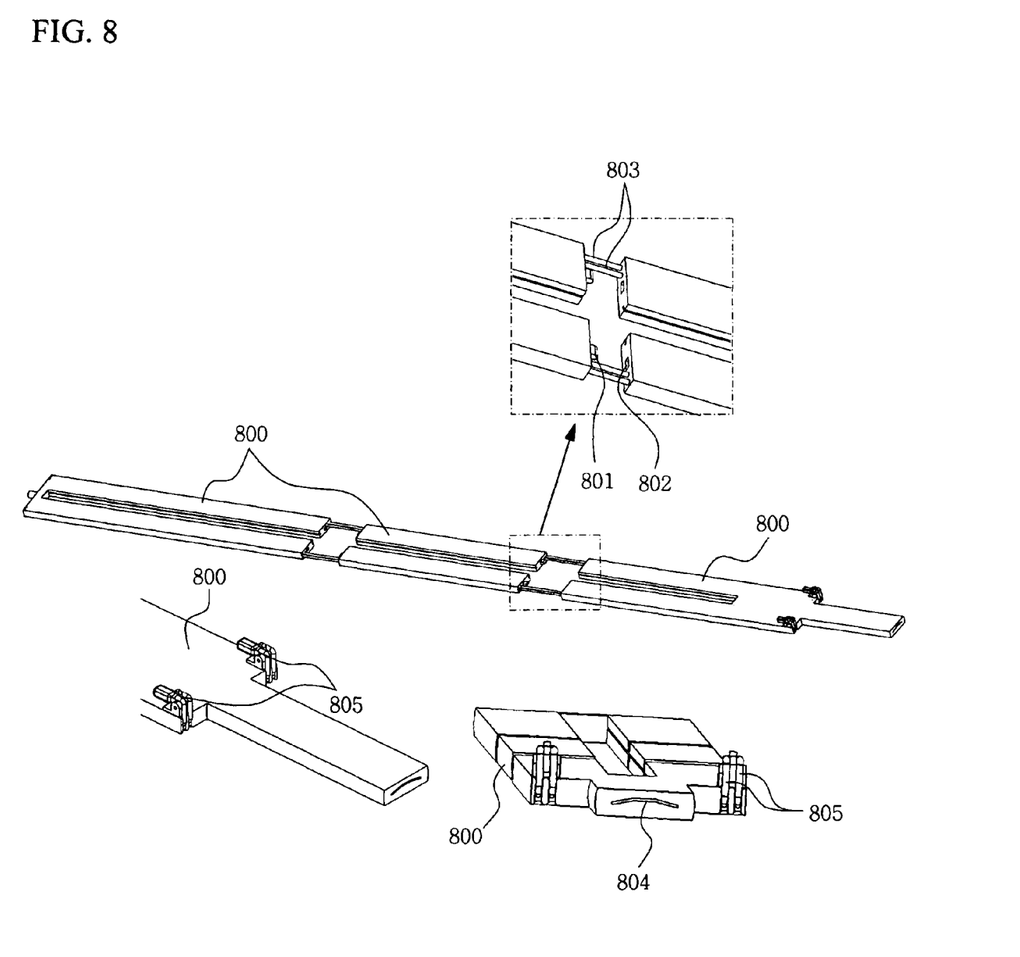
FIG. 8 is a view illustrating a connection relationship between rail segments.
Figures 9A, 9B:
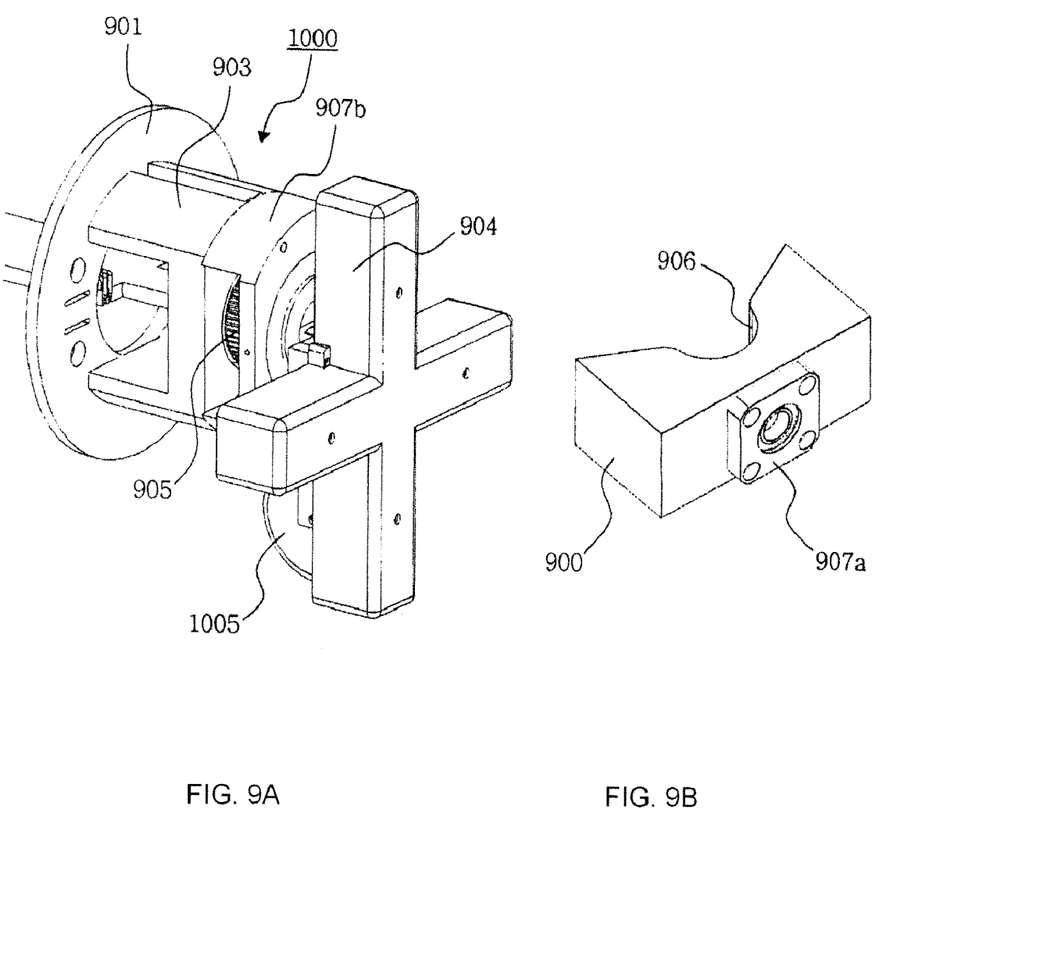
FIGS. 9A and 9B are views illustrating a driving device and a rear rail supporter according to the present invention.

The rail 800, as shown in FIG. 8, has the crescent-shaped transfer strip slot 804 to allow the transfer strip 701 to pass through the slot 804 while maintaining the crescent cross section thereof, thereby eliminating a buckling. In consideration of the excessively long length of the rail 800, the rail 800 is divided into three rail segments 800 for maximizing convenience not only in storage, but also in installation with respect to the steam generator. To accurately connect the plurality of rail segments 800 into the straight single rail 800, the respective rail segments 800 are provided with guiding protrusions 801 and guiding recesses 802. In addition, as tensioners 805 are used to tightly pull tension wires 803 using levers, the three rail segments 800 are firmly assembled into the single rail 800.

To assure stable twisting rotation of the rail 800, the rail 800 may be supported using bearings with minimized friction. For this, the rear and front rail supporters 900 and 903 have bearing housings 907a and 907b, respectively. In particular, the rear rail supporter 900 has a rod fixing recess 906, in which a cylindrical fixing rod 103 of the steam generator is seated, to support stable twisting rotation of the rail 800.

The driving device 1000 provides power required for rectilinear reciprocating movements and twisting rotation of the lancing robot 300 and barrel spray 600. The driving device 1000 includes first and second servo motors 1001 and 1003, a gear 1002, a pulley 1006 and the like. As the first servo motor 1001 transmit a rotating force to a rotating joint 905 using the gear 1002 so as to rotate the rail 800, twisting rotation of the lancing robot 300 and barrel spray 600 is accomplished.

In addition, upon rectilinear reciprocating movements of the lancing robot 300 and barrel spray 600, the second servo motor 1003 transmits a rotating force to the pulley 1006 to move the transfer strip 701 through the crescent-shaped transfer strip slot 804 of the rail 800, thereby creating a thrust force sufficient to push the lancing robot 300 and barrel spray 600. In this case, the transfer strip 701 is continuously supplied from the strip scroll box 1005 in the same manner as a tapeline, thereby serving to move the lancing robot 300 and barrel spray 600 to the end of the rail 800.

The cruciform protective cap 904 functions to prevent foreign matter from entering the second servo motor 1003, pulley 1006, and transfer strip 701 and the like of the driving device 1000.

Figure 11:
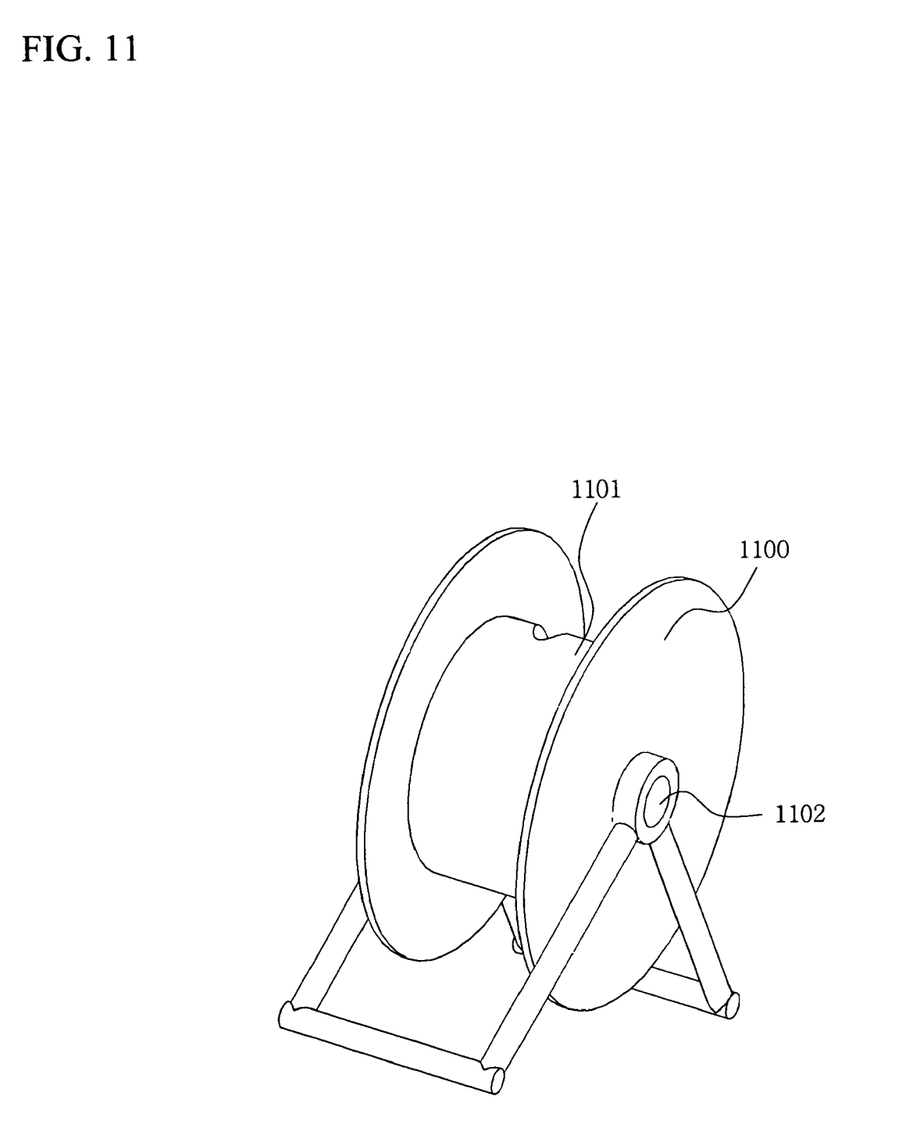
FIG. 11 is a view illustrating a cable handling device according to the present invention.

The cable handling device 1100 is designed to prevent an electric power cable or high-pressure water hose from hindering operations of the hydraulic drive type partial inter-tube lancing system. More specifically, the lancing robot 300 and barrel spray 600 of the hydraulic drive type partial inter-tube lancing system are installed to a steam generator 100 and are linearly moved inward of the steam generator 100 from the hand-hole 102 as an entrance. In this case, when the lancing robot 300 and barrel spray 600 initially perform a cleaning operation at the entrance of the lancing system, the cable or hose, wound on the cable handling device 1100, is gradually unwound to follow the lancing robot 300 and barrel spray 600 so as not to prevent movement of the lancing robot 300 and barrel spray 600. For this, the hose or cable wound on the cable handling device 1100 enters the cable handling device 1100 along a spiral hole 1101 formed in a circumferential direction of the cable handling device 1100 and exits from a rotation center tube 1102 of the cable handling device 1100 to thereby be connected with a pump, power source, or endoscope control device.

Hereinafter, operation of the hydraulic drive type partial inter-tube lancing system having the above-described constituent elements according to an exemplary embodiment will be described in detail with reference to FIGS. 1 to 10 of the accompanying drawings.

The steam generator 100 is adapted to generate steam via heat exchange between reactor (primary) cooling water, heated in a reactor of a nuclear power plant, and secondary cooling water. In this case, the cooling water flows at a relatively slow flow rate at the upper end of the tube sheet, causing metallic sludge contained in the secondary cooling water to accumulate, in a relatively large amount, on the upper end of the tube sheet. To remove the metallic sludge, the hydraulic drive type partial inter-tube lancing system is installed in the steam generator 100.

Figure 1:
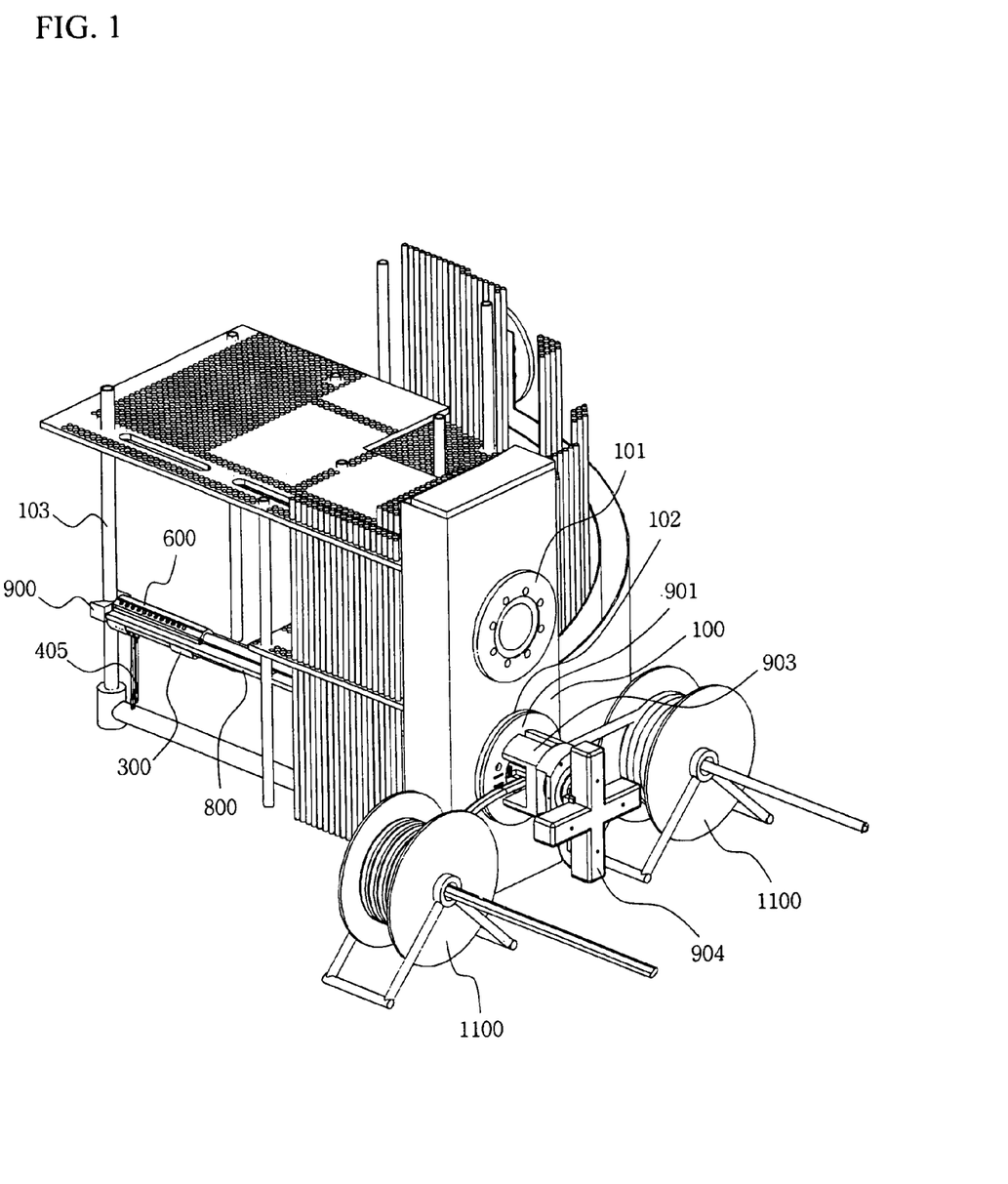
FIG. 1 is a view illustrating a hydraulic drive type partial inter-tube lancing system for cleaning a steam generator in a nuclear power plant, which is installed on a no-tube-lane above a tube sheet in a lower region of the steam generator.
Figure 2:
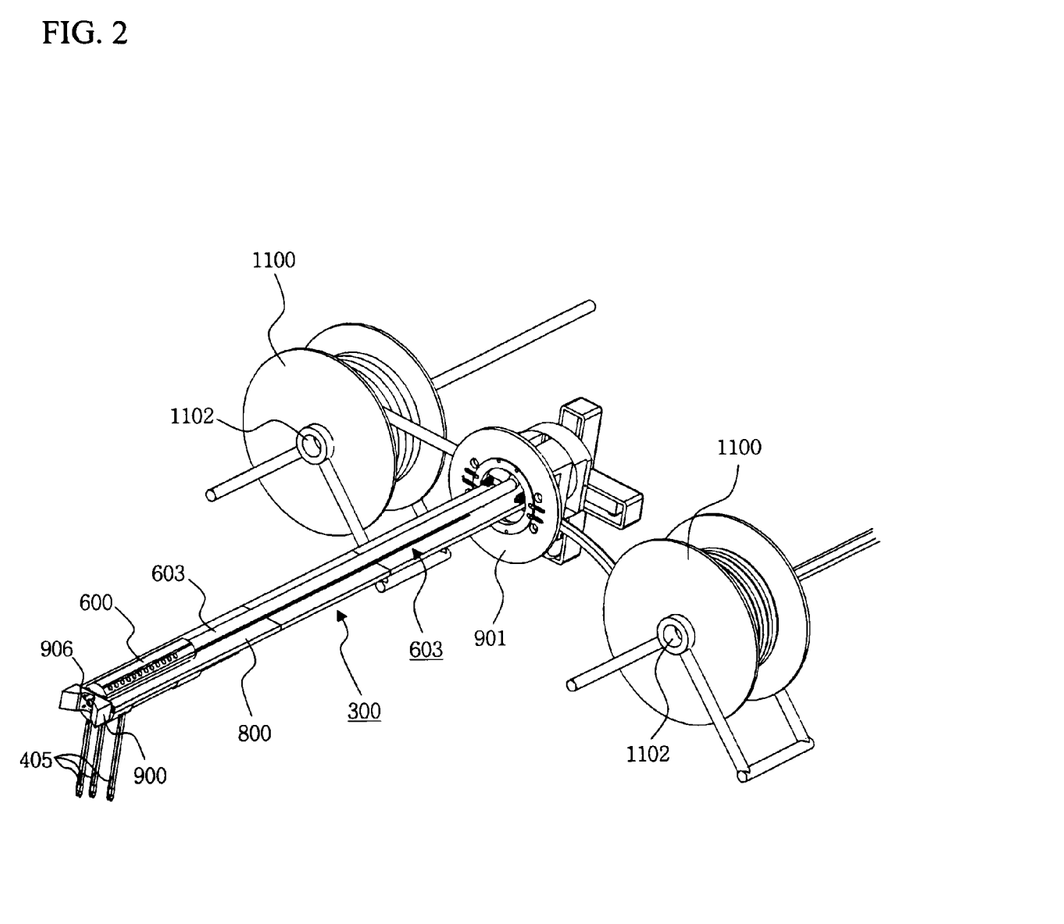
FIG. 2 is a view illustrating only the hydraulic drive type partial inter-tube lancing system according to the present invention.

FIG. 1 is a view illustrating the hydraulic drive type partial inter-tube lancing system installed on a no-tube-lance above the tube sheet (not shown) in a lower region of the steam generator.

Figure 10:
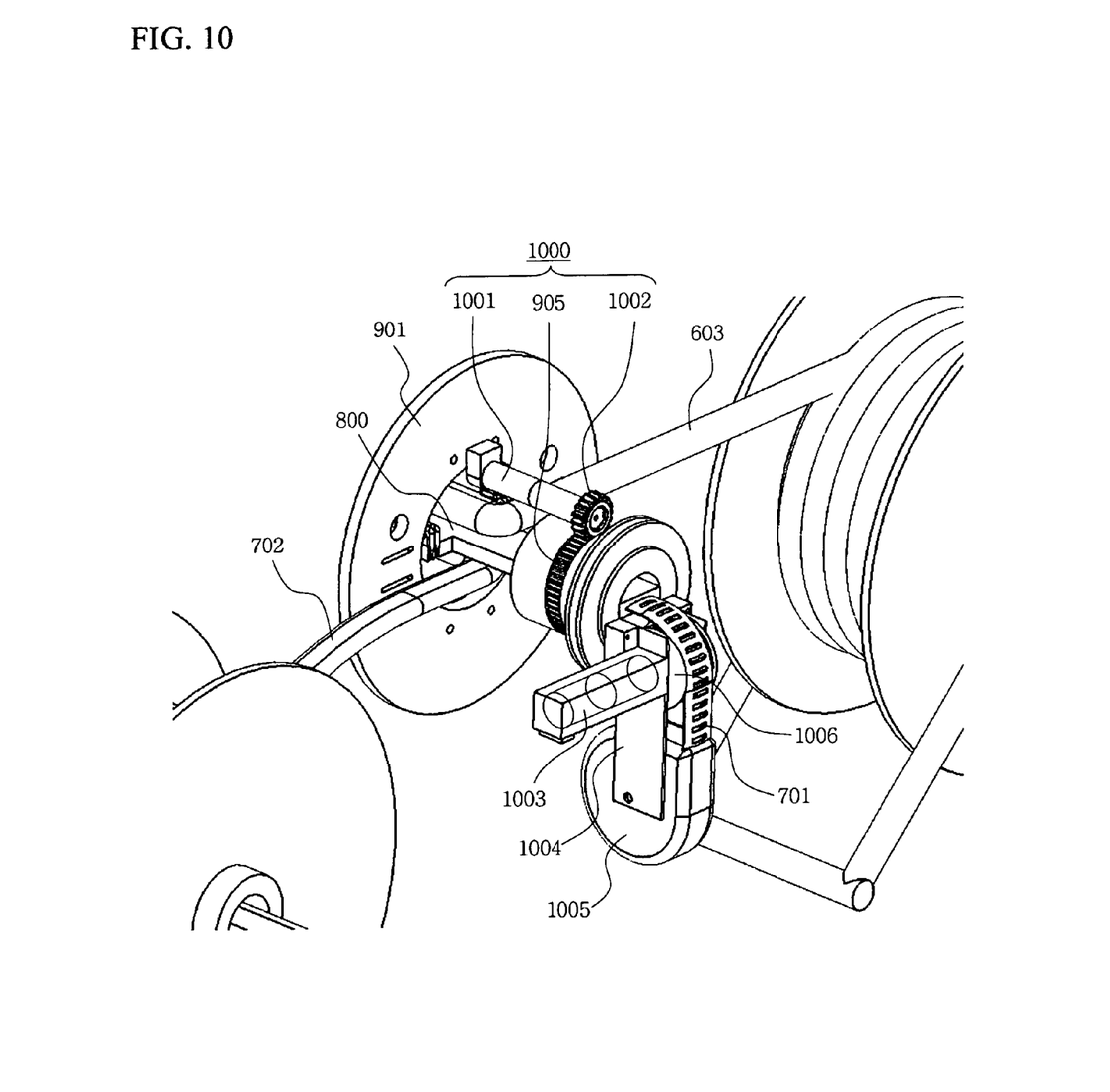
FIG. 10 is a view illustrating a connection relationship of the driving device according to the present invention.

As shown in FIGS. 1 and 10, to install the hydraulic drive type partial inter-tube lancing system in the steam generator 100, first, after the driving device 1000 and hand-hole flange 901 of the lancing system are bolted to each other, four bolt holes of the hand-hole flange 901 are aligned with those of the hand hole 102 to fasten the hand-hole flange 901 and the hand-hole 102 with each other using stud bolts.

As shown in FIG. 8, the three rail segments 800 are connected with one another using the tension wires 803 and are linearly aligned using the guiding protrusions 801 and guiding recesses 802. Thereafter, once the tension wires 803 are tightened using the tensioners 805 to assemble the rail segments 800 into the single firm rail 800, the rotating joint 905 is assembled to the rail 800, and more particularly, a foremost rail segment of the rail 800 using bolts and then, the rail supporters 900 and 903 are assembled to the rear and front sides of the rail 800 (See FIGS. 2 and 9).

After assembling the rail 800, the transfer strip 701 is manually pushed into the transfer strip slot 804. Thereafter, as shown in FIG. 7, if the lancing robot 300 and barrel spray 600, which are connected with the desired high-pressure hose and cable, are mounted, using bolts, to the assembled rail 800 with the transfer strip 701 interposed therebetween, the lancing robot 300 and barrel spray 600 can freely move linearly along the rail 800.

The assembly of the rail 800, lancing robot 300 and barrel spray 600 is introduced into the steam generator 100 through openings of the hand-hole flange 901 and driving device 1000 which are previously mounted in the steam generator 100. Then, as the rod fixing recess 906 of the rear rail supporter 900 is fixed to the cylindrical fixing rod 103 of the steam generator 100 and the front rail supporter 903 is bolted with the driving device 1000, the installation of the hydraulic drive type partial inter-tube lancing system is completed.

The completely installed hydraulic drive type partial inter-tube lancing system performs an operation for cleaning the steam generator 100 as follows.

First, in a state wherein the barrel spray 600 is oriented toward the upper end of the tube sheet in the steam generator 100 via twisting rotation of the rail 800 by 180 degrees, the barrel spray 600 is gradually moved on a per tube row basis from the hand-hole 102 toward the center of the steam generator 100, so as to clean a kidney-bean zone where a great amount of sludge is deposited using a high flow rate of high-pressure water. In this case, a position of the barrel spray 600 is calculated by an encoder of the associated servo motor based on previously input layout data of heat transfer tubes, to enable an automatic cleaning operation using the high flow rate of high-pressure water on a per tube row basis.

After completing the cleaning operation of the barrel spray 600, the lancing robot 300 is oriented toward the upper end of the tube sheet in the steam generator 100 via twisting rotation of the rail 800 by 180 degrees, to perform a high-pressure water cleaning operation on a deep region between heat transfer tubes.

As shown in FIG. 3, prior to initially installing the lancing robot 300 at the hand-hole 102 of the steam generator 100, in a state wherein all three lances 301 of the lancing robot 300 are folded under the influence of the electromagnetic lance return block 303 and return spring 501, an electromagnetic attraction of the lance return block 303 is eliminated and high-pressure water is supplied into the lances 301 to create a hydraulic force overcoming a tensile force of the spring 501, whereby the lances 301 are unfolded and are erected vertically by the hydraulic force so as to eject high-pressure water. Then, as the lances 301 are introduced into gaps between the heat transfer tubes via clockwise twisting rotation of the rail 800, the lancing robot 300 can clean even a deep region between the heat transfer tubes using a significantly greater hydraulic force than the barrel spray 600. Then, this high-pressure water cleaning is again performed on an opposite deep region between the heat transfer tubes via counterclockwise twisting rotation of the rail 800. Similarly, the cleaning operation of the lancing robot 300 can be performed automatically on a per tube row basis using the encoder of the associated servo motor from the entrance to the center of the steam generator 100.

If necessary, to maximize cleaning efficiency, a pair of the hydraulic drive type partial inter-tube lancing systems may be installed at hand-holes of the steam generator opposite each other, to symmetrically perform the above-described cleaning operation.

As apparent from the above description, a hydraulic type partial inter-tube lancing system for cleaning a steam generator in a nuclear power plant according to the present invention is designed to clean a model F steam generator of a light-water reactor. The hydraulic type partial inter-tube lancing system is installed via a hand-hole of the steam generator in such a manner that a rail is installed through a no-tube lane, and a lancing robot and barrel spray are mounted at opposite sides of the rail to perform both barrel spraying and lancing operations. A driving device to operate the lancing robot and barrel spray is installed at the outside of the steam generator and therefore, this has the effect of preventing motor failures that frequently occur in conventional cleaning systems.

According to the present invention, the barrel spray employs an increased number of nozzles, thereby enabling a more rapid implementation of a cleaning operation with a higher flow rate of high-pressure water. Also, the lancing robot can more safely access a deep region between heat transfer tubes of the steam generator by virtue of an increased length of lances. In the present invention, the lancing robot may be provided with three lances, and can simultaneously clean three rows of heat transfer tubes via one ejection of high-pressure water, resulting in a reduction in lancing operation time.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A hydraulic drive type partial inter-tube lancing system for cleaning a steam generator in a nuclear power plant, wherein:
   a rail is installed in an elongated rectangular receiving space in the steam generator, by use of a rail supporter and hand-hole flange fastened to a cylindrical fixing rod and hand-hole of the steam generator, by passing through a driving device;
   the driving device includes first and second servo motors, a pulley, a strip scroll box from which a transfer strip is unwound so as not to prevent operation of the system, and a geared rotating joint for transmission of a twisting rotation force;
   the rail takes the form of an assembly of three rail segments and has a center elongated rectangular opening for mounting of a lancing robot and barrel spray, and a transfer strip slot for movement of the transfer strip, the rail being able to perform twisting rotation;
   the lancing robot includes an elongated lance of a small-diameter and long-length provided with a high-pressure water nozzle to eject high-pressure water with straightness; and
   a cable handling device is provided to handle an electric power cable or a high-pressure water hose for supplying electric power and high-pressure water to the system so as not to prevent operation of the system.

2. The system according to claim 1, wherein the three rail segments of the rail are connected with one another using tension wires and are tightened using tensioners to construct the single straight firm rail under assistance of guiding protrusions and guiding recesses thereof, the rail enabling twisting rotation and rectilinear reciprocating movements of the lancing robot and barrel sprayer for a cleaning operation.

3. The system according to claim 1, wherein the rotating joint is attached to a foremost one of the rail segments and performs twisting rotation under operation of the second servo motor to transmit a twisting rotation force to the rail segment so as to rotate the lancing robot and barrel spray, and the transfer strip is fed into the transfer strip slot of the rail via simultaneous twisting rotation of the second servo motor, pulley and strip scroll box connected with the rotating joint.

4. The system according to claim 1, wherein the barrel spray performs rectilinear reciprocating movements and twisting rotation, together with the lancing robot, under assistance of the transfer strip and rail via operation of the driving device installed at the outside of the steam generator, and the barrel spray has a plurality of nozzles to clean a larger area via one ejection of high-pressure water.

5. The system according to claim 4, wherein the lancing robot performs rectilinear reciprocating movements and twisting rotation, similar to the barrel spray, wider assistance of the transfer strip and rail via operation of the driving device installed at the outside of the steam generator, and the lancing robot has three elongated lances to simultaneously clean three rows of heat transfer tubes via one ejection of high-pressure water, the lances being folded and unfolded via a simplified operating mechanism using a hydraulic force of high-pressure water and elasticity of a spring.

6. The system according to claim 5, wherein the three lances are assembled to the lancing robot such that two nozzles are allotted per lance, and a lance supporter is provided to enable stable ejection of high-pressure water with reduced vibration and increased straight ejection distance so as to access a deeper region between heat transfer tubes.

7. The system according to claim 1, wherein the strip scroll has a no-spring scroll to minimize driving load of the second servo motor, and the transfer strip is unwound from the strip scroll box when the lancing robot is moved inward of the steam generator and is again wound into the strip scroll box when the lancing robot is moved toward the hand-hole located at the edge of the steam generator.

8. The system according to claim 7, wherein the transfer strip is unfolded into an elongated rectangular cross section within the strip scroll box due to an elastic restoration force thereof, and is bent into a crescent cross section through a crescent slot when being unwound from the strip scroll box, and the unwound transfer strip is introduced into the transfer strip slot of the rail by way of the pulley to push the lancing robot and barrel spray without buckling thereof.

9. The system according to claim 1, wherein the cable handling device has a spiral hole formed in a circumferential direction of a scroll on which a cable or high-pressure water hose is wound such that the cable or hose penetrates through the spiral hole to thereby exit from the center of the cable handling device, and as the lancing robot or barrel spray is moved toward the center of the steam generator from the hand-hole at the edge of the steam generator during a steam generator cleaning operation, the cable or hose on the cable handling device is unwound to follow the lancing robot or barrel spray so as to assist the cleaning operation of the lancing robot or barrel spray.

* * * * *